March 3, 1959 F. W. MURPHY 2,875,617
MAGNETICALLY CONTROLLED FUEL VALVE
Filed July 30, 1957 2 Sheets-Sheet 2
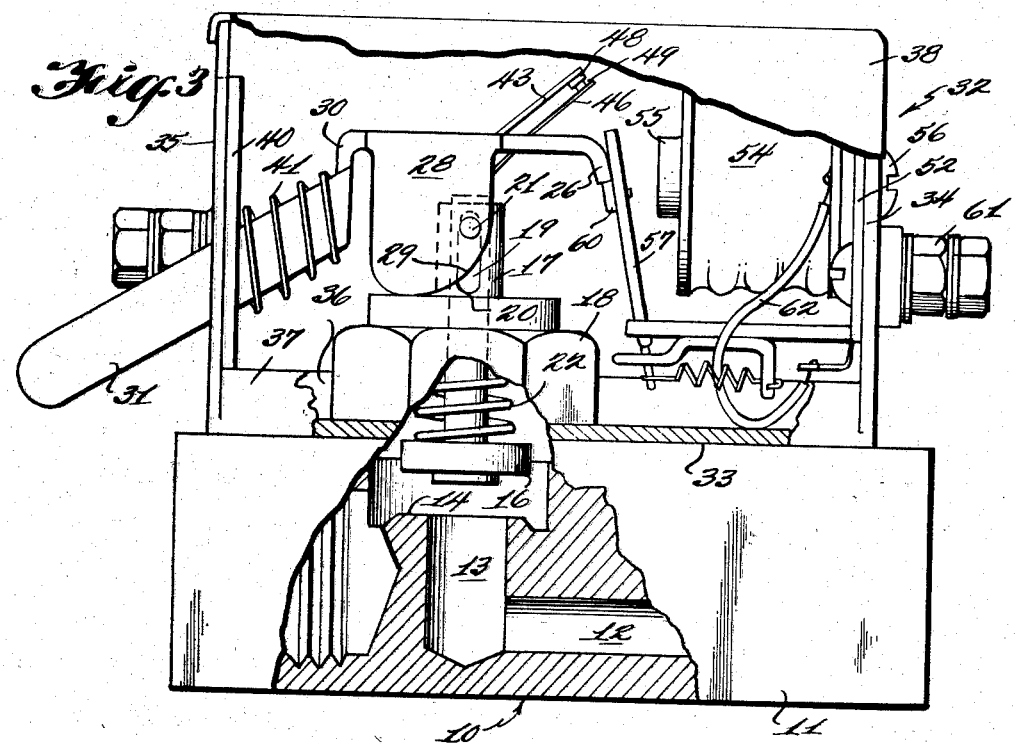
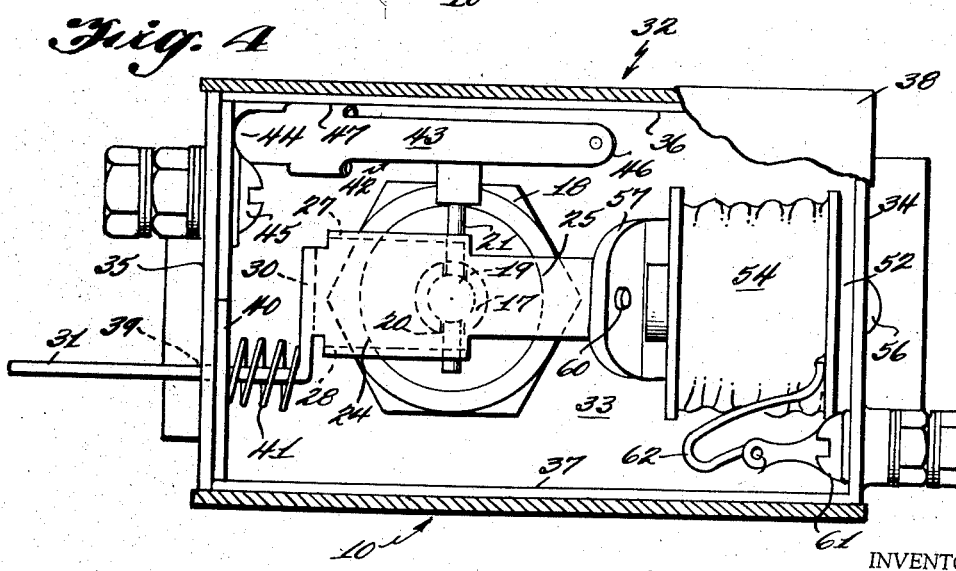
INVENTOR
FRANK W. MURPHY
BY Kimmel & Crowell
ATTORNEYS United States Patent Office 2,875,617
Patented Mar. 3, 1959

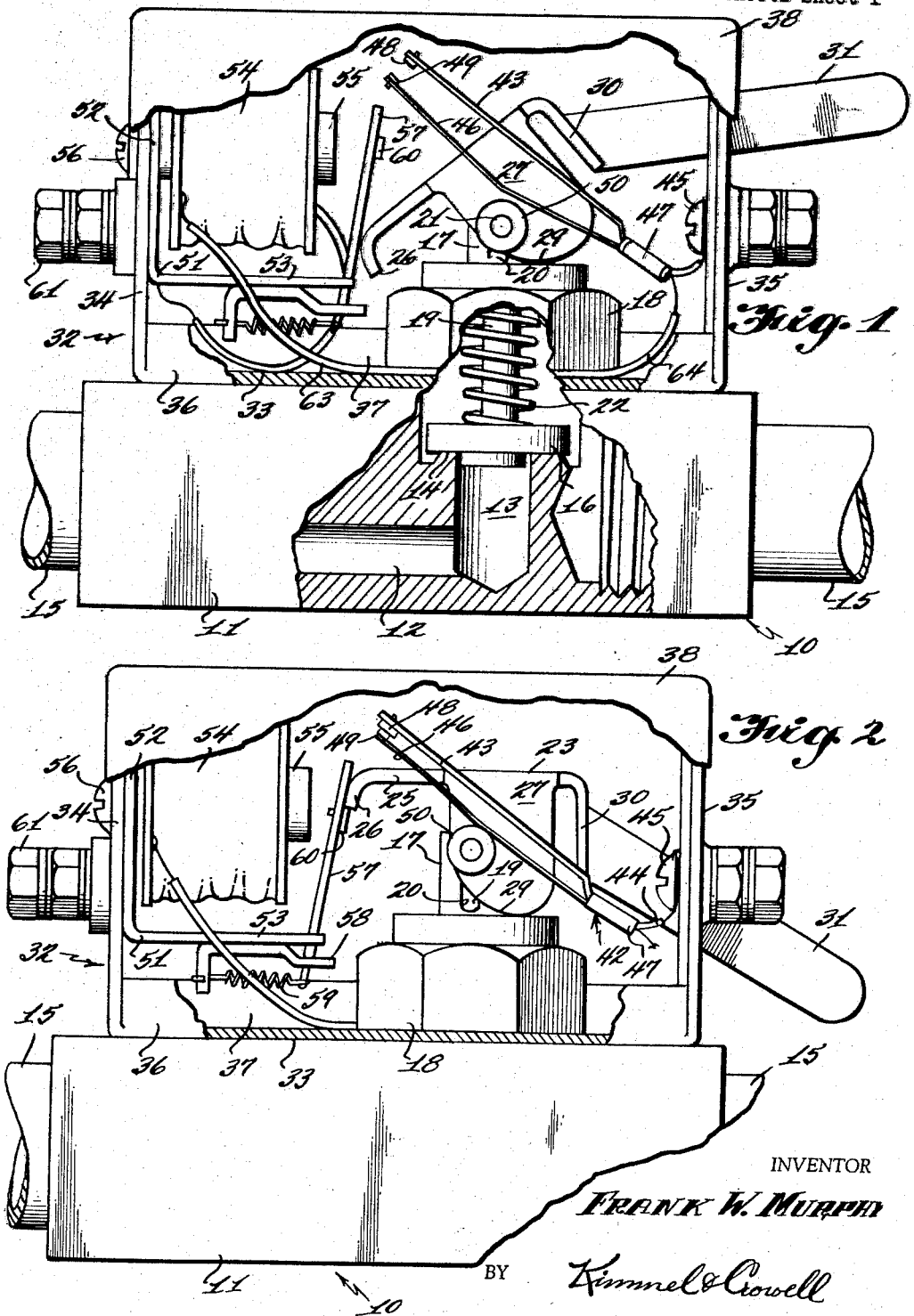

2,875,617
MAGNETICALLY CONTROLLED FUEL VALVE

Frank W. Murphy, Tulsa, Okla.

Application July 30, 1957, Serial No. 675,207

4 Claims. (Cl. 74—2)

The present invention relates to magnetically controlled fuel valves, and more particularly to safety shutoff valves for controlling the fuel supply on malfunctioning of the engine.

The primary object of the invention is to provide a magnetically released spring closed valve for interrupting the fuel flow to an engine upon the attainment of predetermined abnormal conditions.

Another object of the invention is to provide a device of the class described above in which the magnetic circuit is interrupted upon closing of the fuel valve.

A further object of the invention is to provide a safety valve of the class described above having a combined actuator handle and valve condition indicator extending outwardly therefrom.

A still further object of the invention is to provide a safety shutoff valve of the class described above which is inexpensive to manufacture, simple to install, and completely positive in its action.

Other objects and advantages will become apparent in the following specification when considered in the light of the attached drawings, in which:

Figure 1 is a side elevation of the invention shown partially broken away and in section for convenience of illustration.

Figure 2 is a view similar to Figure 1, with the parts shown in operating position.

Figure 3 is a side elevation of the invention, shown partially broken away and in section, with the parts illustrated in the same position as shown in Figure 2.

Figure 4 is a top plan view of the invention shown partially broken away and in section for convenience of illustration.

Referring now to the drawings in detail wherein like reference characters indicate like parts throughout the several figures, the reference numeral 10 indicate generally a magnetically released safety fuel shutoff valve constructed in accordance with the invention.

The safety valve 10 includes a fuel valve body 11 having a port 12 extending therethrough and opening into a valve chamber 13. A valve seat 14 is formed on the upper end of the valve chamber 13. Conduits 15 are connected to opposite ends of the valve body 11 to carry fuel therethrough.

A valve 16 is mounted for vertical reciprocation within the valve body 11 and engages against the valve seat 14 to close the port 12. A hollow boss 17 is mounted on a fitting 18 secured to the valve body 11 and supports the stem 19 of the valve 16 above the fitting 18.

The hollow boss 17 is longitudinally slotted at 20 to permit a shaft 21 to extend therethrough. The shaft 21 is fixed in the upper end of the stem 19 of the valve 16. A coil spring 22 surrounding the stem 19 engages at one end against the valve 16 and at the other end against the lower end of the boss 17 to normally urge the valve 16 into contact with the valve seat 14.

An actuator 23 includes a generally horizontal flat central portion 24 having an elongated tongue 25 extending therefrom. The elongated tongue 25 has a downwardly curved terminal end portion 26 formed on one end thereof.

A pair of cam plates 27, 28 are integrally formed with the actuator 23 and extend downwardly from the opposite sides thereof in spaced parallel relation. The cam plates 27, 28 each have a cam surface 29 formed on their lower edge portions for engagement with the upper face of the fitting 18.

The actuator 23 is provided at the end opposite the tongue 25 with a downwardly projecting extension 30 having a handle 31 integrally formed therewith and extending perpendicularly thereto. The shaft 21 projects through the cam plates 27, 28 to pivotally mount the actuator 23 thereon.

A housing, indicated generally at 32, has a bottom wall 33 positioned in engagement with the valve body 11 and secured thereon by the fitting 18. The housing 32 includes a pair of oppositely disposed parallel end walls 34, 35 integrally formed with the opposite ends of the bottom wall 33. Stub side walls 36, 37 extend upwardly from the opposite sides of the bottom wall 33 and are integrally formed therewith. A cover 38 is supported on the end walls 34, 35 and is secured to the stub side walls 36, 37 to enclose the valve actuation mechanism.

The handle 31 extends through an elongated slot 39 in the end wall 35 and has a relatively soft fabric cover 40 engaged about the handle 31 to close the slot 39 to prevent dirt from entering the housing 32. A coil spring 41 engages about the handle 31 extending between the member 30 and the fabric closure 40 to maintain the closure 40 in contact with the elongated slot 39.

A switch indicated generally at 42 includes a relatively stiff contact arm 43 having an arcuate extension 44 secured to the end wall 35 by means of a contact bolt 45. A spring contact arm 46 is supported on the stiff contact arm 43 by an insulating fitting 47 to support the resilient contact arm 46 adjacent the rigid contact arm 43.

Contact points 48 and 49 are formed respectively on the contact arms 43, 46, and the spring arm 46 is normally biased away from the rigid contact arm 43. A roller 50 is mounted on one end of the shaft 21 and engages the spring contact arm 46 to normally close the contact points 48, 49, as shown in Figure 2.

An L-shaped bracket 51 has a vertical leg 52 arranged in engagement with the inner face of the end wall 34 and has a perpendicularly extending horizontal leg 53 projecting toward the end wall 35. An electro-magnet 54 is positioned in engagement with the leg 52 spaced above the leg 53 and has a core 55 arranged at one end thereof opposite the end wall 34.

A securing bolt 56 extends through the end wall 34, the bracket 51, and into the electro-magnet 54 to secure the magnet 54 and bracket 51 to the end wall 34.

An armature 57 is pivotally mounted on the outer end of the leg 53 and is secured thereon by a bracket 58. A spring 59 extends between the armature 57 and the bracket 58 to normally bias the armature 57 away from the core 55 to the position illustrated in Figure 1.

The armature 57 has formed on the face thereof toward the actuator 23 a boss 60 arranged to engage under the arcuate terminal end 26 of the tongue 25 to support the actuator 23 in upright position, as illustrated in Figure 2.

A terminal bolt 61 is mounted on the end wall 34 and has extending therefrom a wire 62 connected to one end of the electro-magnet 54. A wire 63 extends from the other side of the electro-magnet 54 to the spring contact arm 46.

The rigid contact arm 43 is connected to the terminal bolt 45 so that a circuit is established through the electro-magnet 54 from the terminal bolt 61 to the terminal bolt 45 when the contact points 48, 49 are engaged.

The terminal bolts 45, 61 are connected to an internal combustion engine in such a way that malfunctioning of the engine will cause an electric current to flow therebetween. When this occurs, the electro-magnet 54 is energized and the armature 57 is attracted thereto so that the boss 60 is withdrawn from beneath the tongue 25 to permit the spring 22 to tilt the actuator 23 to the position illustrated in Figure 1.

When this occurs, the valve 16 is pressed against the seat 14 by the spring 22, and simultaneously therewith the roller 50 is moved away from the spring arm 46 to permit the contact points 48, 49 to separate and break the circuit through the electro-magnet 54. The breaking of the circuit through the electro-magnet 54 prevents the magnet from being burned out by prolonged load, as well as removing the electro-magnet from the battery circuit so as to prevent the battery from being discharged while waiting for the device to be reset.

After the malfunction of the engine with which the safety valve 10 is used has been corrected, the valve 16 can be opened by pressing the handle 31 downwardly until the curved end portion 26 of the tongue 25 again engages over the boss 60 which serves as a trigger to lock the valve 16 in open position.

Having thus described the preferred embodiment of the invention, it should be understood that numerous structural modifications and adaptations may be resorted to without departing from the scope of the appended claims.

What is claimed is:

1. An actuating mechanism for a spring closed valve of the type having a reciprocating valve stem comprising, a fitting through which said stem is adapted to extend, a hollow boss extending upwardly from said fitting and adapted to encompass said stem, said hollow boss having an elongated longitudinal slot extending therethrough intermediate the opposite ends thereof, a transverse shaft extending through the slot in said boss and rigidly connected to said stem, a lever journalled on said shaft, a cam face formed on said lever and adapted to engage said fitting whereby on rotary movement of said lever said shaft is moved longitudinally in said slot, a trip tongue integrally formed on said lever and extending outwardly therefrom, an electro-magnet mounted adjacent said trip tongue, and an armature associated with said electro-magnet for movement from a position supporting said trip tongue against the tension of a spring closing means mounted on the opposite side of said fitting from said lever with said electro-magnet deenergized to a position releasing said trip tongue upon energization of said electro-magnet.

2. A device as claimed in claim 1 wherein electro-magnet switch control means are mounted adjacent said lever, and means mounted on said lever normally maintaining said switch in electro-magnet energizing position when said trip tongue is supported on said armature.

3. A trip mechanism comprising a fitting, a stem axially slidably mounted in said fitting, a coil spring encompassing said stem and engaging one side said fitting at one end and said stem at the other end normally biasing said stem in one direction in said fitting, a tranverse shaft rigidly secured to said stem, a lever journalled on said transverse shaft, a cam surface formed on said lever engaging the other side of said fitting for retracting said stem against tension of said spring on rotary movement of said lever in one direction, means supporting said lever in stem retracting position, and electro-magnet means for moving said last named means to release said lever whereby said spring moves said stem axially in said fitting.

4. A device as claimed in claim 3 wherein a control switch for said electro-magnet is mounted adjacent said lever, and means on said lever maintains said switch in electro-magnet energizing position with said lever in stem retracted position whereby on movement of said lever with said stem when released from said supporting means said switch deenergizes said electro-magnet.

References Cited in the file of this patent

UNITED STATES PATENTS

| | | |
|---|---|---|
| 434,671 | Mellett | Aug. 19, 1890 |
| 2,304,844 | Parker | Dec. 15, 1942 |
| 2,690,189 | Rice | Sept. 28, 1954 |